US008655983B1

(12) United States Patent
Harris et al.

(10) Patent No.: US 8,655,983 B1
(45) Date of Patent: Feb. 18, 2014

(54) SYSTEM AND METHOD FOR LOCATION MONITORING BASED ON ORGANIZED GEOFEEDS

(71) Applicant: Geofeedr, Inc., Naples, FL (US)

(72) Inventors: Philip B. Harris, Naples, FL (US); Scott K. Mitchell, Naples, FL (US); Michael J. Mulroy, Glencoe, IL (US)

(73) Assignee: Geofeedr, Inc., Naples, FL (US)

( * ) Notice: Subject to any disclaimer, the term of this patent is extended or adjusted under 35 U.S.C. 154(b) by 0 days.

(21) Appl. No.: 13/708,516

(22) Filed: Dec. 7, 2012

(51) Int. Cl.
G06F 15/16 (2006.01)

(52) U.S. Cl.
USPC ............ 709/217; 709/201; 709/218; 709/219

(58) Field of Classification Search
None
See application file for complete search history.

(56) References Cited

U.S. PATENT DOCUMENTS

| | | | |
|---|---|---|---|
| 6,363,320 B1 | 3/2002 | Chou | 701/207 |
| 8,103,741 B2 | 1/2012 | Frazier et al. | 709/217 |
| 8,341,223 B1 | 12/2012 | Patton et al. | 709/204 |
| 8,428,228 B1 | 4/2013 | Baxter, Jr. | 379/88.14 |
| 2002/0029226 A1 | 3/2002 | Li et al. | 707/104.1 |
| 2003/0088609 A1 | 5/2003 | Guedalia et al. | 709/107 |
| 2004/0203854 A1 | 10/2004 | Nowak | 455/456.1 |
| 2004/0225635 A1 | 11/2004 | Toyama et al. | 707/1 |
| 2005/0034074 A1 | 2/2005 | Munson et al. | 715/712 |
| 2006/0002317 A1 | 1/2006 | Punaganti Venkata | 370/310 |
| 2006/0200305 A1 | 9/2006 | Sheha et al. | 701/200 |
| 2007/0143345 A1 | 6/2007 | Jones et al. | 707/104.1 |
| 2007/0210937 A1 | 9/2007 | Smith et al. | 340/995.1 |
| 2007/0276919 A1 | 11/2007 | Buchmann et al. | 709/217 |
| 2008/0092054 A1 | 4/2008 | Bhumkar et al. | 715/739 |
| 2008/0192934 A1 | 8/2008 | Nelger et al. | 380/258 |
| 2008/0250031 A1 | 10/2008 | Ting et al. | 707/100 |
| 2009/0005968 A1 | 1/2009 | Vengroff et al. | 701/202 |
| 2009/0132435 A1 | 5/2009 | Titus et al. | 705/400 |
| 2009/0138497 A1 | 5/2009 | Zavoli et al. | 707/102 |
| 2009/0300528 A1 | 12/2009 | Stambaugh | 715/764 |

(Continued)

FOREIGN PATENT DOCUMENTS

| | | |
|---|---|---|
| EP | 1 045 345 | 10/2000 |
| WO | WO 99/15995 | 4/1999 |
| WO | WO 2010/049918 | 5/2010 |

OTHER PUBLICATIONS

U.S. Appl. No. 13/284,455, non-final Office Action, mailed Jan. 7, 2013, 18 pages.

(Continued)

Primary Examiner — Djenane Bayard
(74) Attorney, Agent, or Firm — Pillsbury Winthrop Shaw Pittman LLP

(57) ABSTRACT

The disclosure relates to systems and methods for monitoring multiple locations based on hierarchical or arbitrary groupings of geofeeds. A geofeed may include content that is aggregated from a plurality of content providers using respective requests formatted specifically for individual ones of the plurality of content providers, where an individual set of a plurality of content is relevant to one or more geo-locations. The system facilitates robust organization, including hierarchical and arbitrary groupings, and analytics applied to the geofeeds. The groupings may be used in a wide range of applications such as location monitoring that allows organizations to manage multiple locations as individual geofeeds and group geofeeds for higher-level monitoring. The system facilitates security settings and rolled up reporting based on permission levels and/or groups of geofeeds, and provides tools to allow management of content that is made available by the system.

21 Claims, 9 Drawing Sheets

(56) References Cited

U.S. PATENT DOCUMENTS

| | | | |
|---|---|---|---|
| 2010/0076968 A1* | 3/2010 | Boyns et al. | 707/732 |
| 2010/0153410 A1 | 6/2010 | Jin et al. | 707/758 |
| 2011/0007941 A1 | 1/2011 | Chen et al. | 382/103 |
| 2011/0010674 A1 | 1/2011 | Knize et al. | 715/849 |
| 2011/0078584 A1 | 3/2011 | Winterstein et al. | 715/751 |
| 2011/0113096 A1 | 5/2011 | Long et al. | 709/204 |
| 2011/0123066 A9 | 5/2011 | Chen et al. | 382/103 |
| 2011/0142347 A1 | 6/2011 | Chen et al. | 382/190 |
| 2011/0288917 A1 | 11/2011 | Wanek et al. | 705/14.5 |
| 2012/0047219 A1 | 2/2012 | Feng et al. | 709/207 |
| 2012/0078503 A1 | 3/2012 | Dzubay et al. | 701/410 |
| 2012/0084323 A1 | 4/2012 | Epshtein et al. | 707/776 |
| 2012/0150901 A1* | 6/2012 | Johnson et al. | 707/769 |
| 2012/0166367 A1* | 6/2012 | Murdock et al. | 706/12 |
| 2012/0221687 A1* | 8/2012 | Hunter et al. | 709/219 |
| 2012/0276848 A1 | 11/2012 | Krattiger et al. | 455/41.2 |
| 2012/0276918 A1 | 11/2012 | Krattiger et al. | 455/456.1 |
| 2013/0018957 A1* | 1/2013 | Parnaby et al. | 709/204 |
| 2013/0073388 A1 | 3/2013 | Heath | 705/14.53 |
| 2013/0110631 A1 | 5/2013 | Mitchell et al. | 705/14.58 |
| 2013/0159463 A1 | 6/2013 | Bentley et al. | 709/217 |

OTHER PUBLICATIONS

U.S. Appl. No. 13/619,888, non-final Office Action, mailed Mar. 1, 2013, 15 pages.

Chow et al., "Towards Location-Based Social Networking Services", *LBSN 2010 Proceedings of the 2nd ACM SIGSPATIAL International Workshop on Location Based Social Networks*, Nov. 2, 2010, pp. 31-38.

Bao, Jie, et al., "GeoFeed: A Location-Aware News Feed System", IEEE Xplore® Digital Library, Published in *2012 IEEE 28th International Conference on Data Engineering*, Apr. 1-5, 2012, 14 pages.

Sarwat, Mohamed, et al., "Sindbad: A Location-Based Social Networking System", *SIGMOD '12*, Scottsdale, Arizona, May 20-24, 2012, 4 pages.

U.S. Appl. No. 13/619,888, a Notice of Allowance, mailed Jul. 9, 2013, 10 pages.

U.S. Appl. No. 13/788,760, a Notice of Allowance, mailed Jul. 26, 2013, 12 pages.

U.S. Appl. No. 13/788,843, a non-final Office Action, mailed Aug. 5, 2013, 17 pages.

U.S. Appl. No. 13/788,909, a non-final Office Action, mailed Aug. 12, 2013, 17 pages.

U.S. Appl. No. 13/843,949, a non-final Office Action, mailed Aug. 29, 2013, 12 pages.

U.S. Appl. No. 13/708,466, a non-final Office Action, mailed Apr. 17, 2013, 15 pages.

U.S. Appl. No. 13/708,404, a Notice of Allowance, mailed May 24, 2013, 12 pages.

U.S. Appl. No. 13/284,455, a non-final Office Action, mailed Jun. 4, 2013, 28 pages.

\* cited by examiner

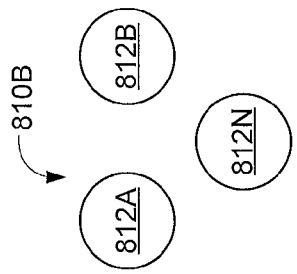
FIG. 9C
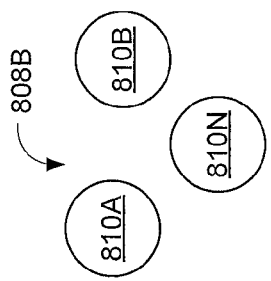
FIG. 9B
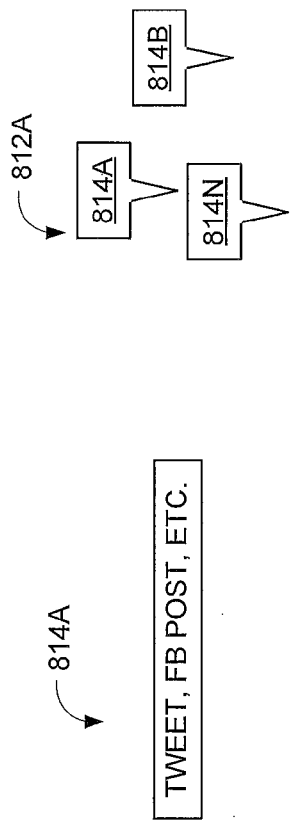
FIG. 9D
FIG. 9E
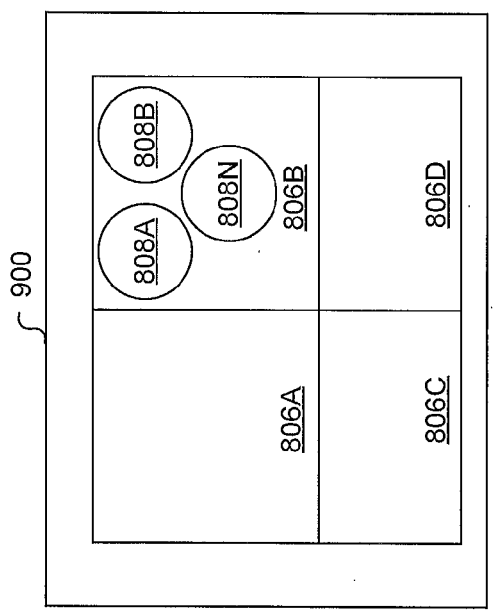
FIG. 9A

SYSTEM AND METHOD FOR LOCATION MONITORING BASED ON ORGANIZED GEOFEEDS

RELATED APPLICATIONS

This application is related to U.S. patent application Ser. No. 13/708,404, filed on Dec. 7, 2012, issued as U.S. Pat. No. 8,484,224 on Jul. 9, 2013, entitled "SYSTEM AND METHOD FOR RANKING GEOFEEDS AND CONTENT WITHIN GEOFEEDS," and co-pending U.S. patent application Ser. No. 13/708,466, filed on Dec. 7, 2012, entitled "SYSTEM AND METHOD FOR GENERATING AND MANAGING GEOFEED-BASED ALERTS," both of which are incorporated by reference in their entireties herein.

FIELD OF THE INVENTION

The disclosure relates to systems and methods for monitoring multiple locations based on hierarchical or arbitrary groupings of geofeeds, including content related to geographically definable locations that is aggregated from a plurality of social media or other content providers.

BACKGROUND OF THE INVENTION

The availability of content such as videos, audio files, photos, text, and/or other content over networks such as the Internet has grown at impressive rates. Many Internet and other online service providers make this type of content available to enable users to post and share such content through their services. However, various limitations exist with respect to how this vast amount of information can be effectively monitored and/or selectively displayed.

Because of the generally disperse and unstructured nature of the wide range of content that is available, it can be difficult to organize and group the content in meaningful ways while maintaining relevance to geographically definable locations.

These and other problems exist.

SUMMARY OF THE INVENTION

The disclosure relates to systems and methods for monitoring multiple locations based on hierarchical or arbitrary groupings of geofeeds. A geofeed may include content that is aggregated from a plurality of content providers using respective requests formatted specifically for individual ones of the plurality of content providers, where an individual set of a plurality of content is relevant to one or more geo-locations.

The system facilitates robust organization and analytics applied to the geofeeds, which may be used in a wide range of applications such as location monitoring that allows organizations to manage multiple locations as one or more individual geofeeds for higher-level monitoring. The system also facilitates security settings based on one or more security roles to manage access to the organization of geofeeds, rolled up reporting to view higher level groupings of content from lower level groupings of content, and workflow tools to allow management of content that is made available by the system.

In some implementations, the system may include a computer that includes one or more processors configured to perform some or all of a functionality of a plurality of modules. For example, the one or more processors may be configured to execute a geofeed creation module, an organizing module, a reporting and analysis module, an administration module, a communication module, a user interface module, and/or other modules.

The geofeed creation module may be configured to receive a request to create a geofeed based on a specification of one or more geo-locations. The request may include one or more geofeed parameters, one or more organization parameters and/or other parameters. The one or geofeed parameters may be used to filter content into the geofeed and/or out of the geofeed. The organization parameters may specify whether and how content within a geofeed should be grouped and/or whether and how a geofeed should be grouped with other geofeeds.

The geofeed creation module may generate a geofeed definition that includes the specification of the one or more geo-locations, the one or more geofeed parameters, the one or more organization parameters, and/or other information related to the geofeed. The geofeed definition may be updated. For example, the specification of the one or more geo-locations, the one or more geofeed parameters, the one or more organization parameters, and/or other information of the geofeed definition may be updated. In this manner, various parameters related to geofeeds may be defined or updated at the time of specifying the geofeeds and/or after the geofeeds have been specified.

The organizing module may be configured to organize geofeeds into one or more groups based on the organization parameters. Groups may be organized hierarchically and/or arbitrarily, either or both of which allows for drill-down, roll-up, and/or other processing operations on geofeeds that can be used to monitor and analyze social media and/or other content from different perspectives.

The organizing module may be configured to organize groups of geofeeds based on a logical hierarchy of groups, which may include a geographic hierarchy of groups. The organizing module may create a first group that includes a first set of one or more geofeeds, a second group that includes a second set of one or more geofeeds, and a third group that includes the first and second groups. For example, the organizing module may organize retail locations into a first group that represents a geographic region, a second group such as a geographic locality that is within the geographic region, and a third group that represents individual locations within the geographic locality.

The organizing module may be configured to organize groups of geofeeds based on arbitrary groups. The organizing module may create a first group that includes a first set of one or more geofeeds based on a first arbitrary grouping and a second group that includes a second set of one or more geofeeds based on a second arbitrary grouping. For example, the organizing module may create a first group that includes geofeeds of top-grossing retail locations, a second group that includes geofeeds of lowest-grossing retail locations, and/or other arbitrary groupings.

Entities other than retail chains may use logically grouped hierarchies of geofeeds as well. For example, using the system, news agencies that wish to leverage social media content and/or other content to drive news stories may organize content geographically. News agencies may monitor social media and/or other content at an international (or other level) and drill down (or up) as appropriate to national, state, or local levels. Similarly, using the system, news agencies may group geofeeds based on arbitrary groupings such as creating hotspot groups that each include geofeeds that have varying degrees of interesting content (e.g., a first group may represent one or more geofeeds that typically produce highly interesting content while a second group may include one or more geofeeds that typically produce less interesting content).

The organizing module may be configured to specify other levels and configurations of groupings, each allowing for drill-down, roll-up, and/or other presentation and analytical processing on social media and other content.

In some embodiments, the retrieving module may be configured to obtain content based on the organization created by the organizing module. For example, retrieving module may be configured to receive a request for social media and/or other content based on a group. The request may include a pull request such as from a user via a user interface, an automated request that runs at regular intervals and/or other request. Whether a pull request, an automated request, and/or other type of request, the retrieving module may be configured to store the obtained content and/or communicate the obtained content.

The retrieving module may identify one or more geofeeds associated with the group based on an association between the group and the one or more geofeeds, based on an association between the group and one or more other groups, and/or other association between groups and geofeeds. The retrieving module may obtain content for the associated geofeeds from a memory and/or dynamically from respective content providers using geofeed definitions that define the one or more geofeeds.

In some embodiments, the reporting and analysis module may be configured to generate reports and analysis on aggregated content based on groupings made by the organizing module. The reporting and analysis module may generate various statistics and metrics on the content.

Using the organization of the content, statistics and metrics may be drilled down from a regional or high level view to a lower-level or more specific view and vice versa. Thus, the reporting and analysis module may be used to provide trends, overall sentiment, and/or other metrics by which a location and groups that represent different locations may be monitored. As such, the reporting and analysis module allows for drill-down and roll-up reporting of the content.

In some embodiments, the administration module may be configured to manage user accounts, set user roles such as security roles, and/or perform other administrative operations. For example, the administration module may be used to set which user may access different groups created by the organizing module. A regional manager, for instance, may be granted access to social media aggregated and organized into a regional group while a local store manager may be granted access only social media aggregated and relevant to the local store.

In some embodiments, the communication module may be configured to generate various communications related to the groups created by the organizing module. For example, the communication module may determine which one or more communication channels should be used to communicate reports and/or aggregated content related to the groups and communicate the information via the one or more communication channel.

In some embodiments, the user interface module may be configured to generate user interfaces that allow viewing and interaction with the groups created by the organizing module. The interfaces may include map displays, collage displays, list displays, and/or other types of interfaces.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 9A illustrates a screenshot of an interface for displaying an organization of geofeeds, according to an aspect of the invention.

FIG. 9B illustrates an example of selectable elements based on a selected element from FIG. 9A, according to an aspect of the invention.

FIG. 9C illustrates an example of selectable elements based on a selected element from FIG. 9B, according to an aspect of the invention.

FIG. 9D illustrates an example of selectable elements based on a selected element from FIG. 9C, according to an aspect of the invention.

FIG. 9E illustrates an example of displayed information based on a selected element from FIG. 9D, according to an aspect of the invention.

DETAILED DESCRIPTION OF THE INVENTION

Figure 1:
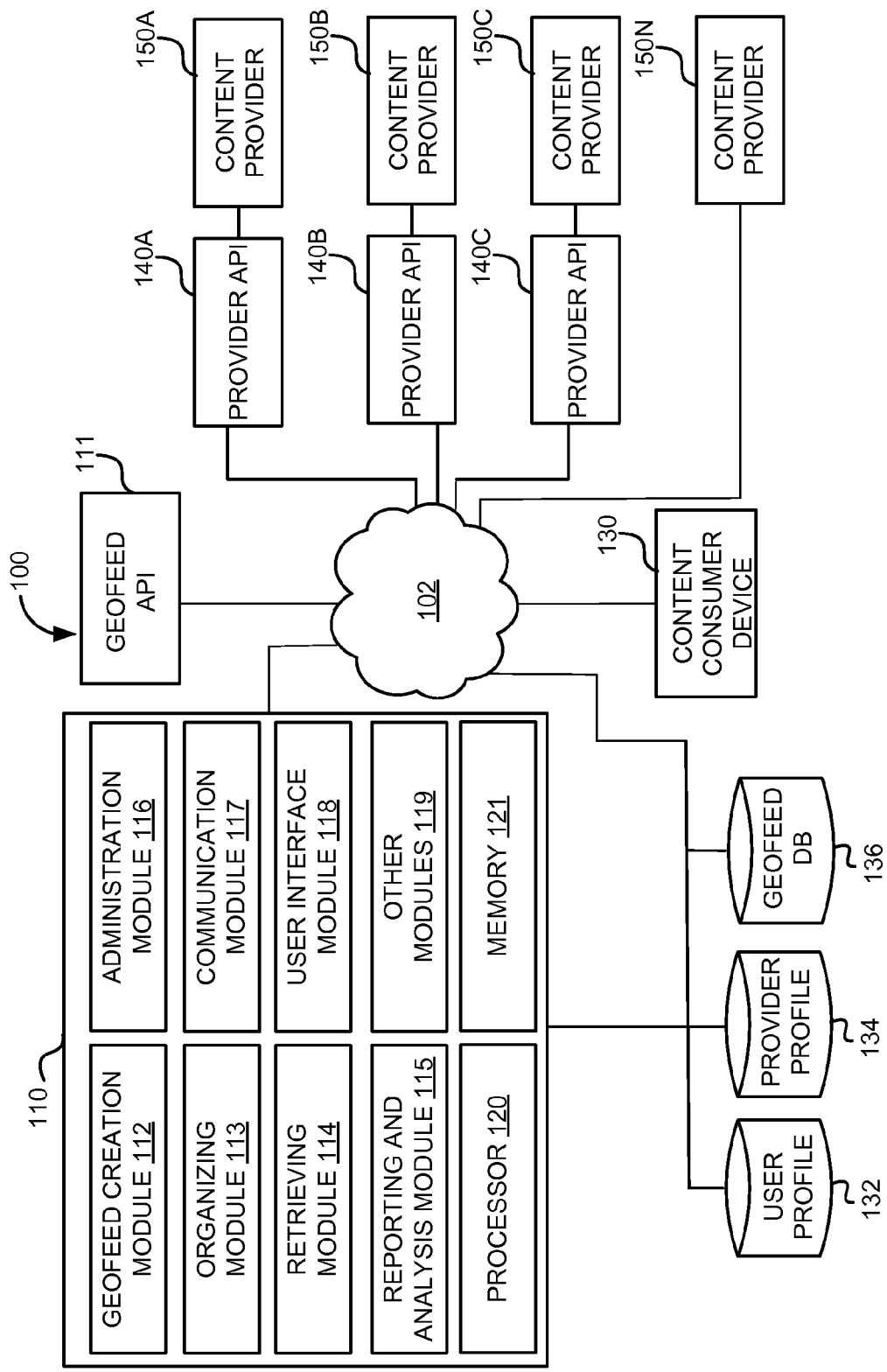
FIG. 1 illustrates a system of facilitating location monitoring based on an organization of individual sets of a plurality of content aggregated from content providers and relevant to one or more geographically definable locations, according to an aspect of the invention.

The disclosure relates to systems and methods for monitoring multiple locations based on hierarchical or arbitrary groupings of geofeeds. A geofeed may include content that is aggregated from a plurality of content providers using respective requests formatted specifically for individual ones of the plurality of content providers, where an individual set of a plurality of content is relevant to one or more geo-locations.

The content providers may include, for example, social media platforms (e.g., FACEBOOK, TWITTER, INSTA- GRAM, FLICKR, etc.), online knowledge databases, and/or other providers that can distribute content that may be relevant to a geo-location. The geo-location may be specified by a boundary, geo coordinates (e.g., latitude, longitude, altitude/depth), an address, a school, a place name, a point of interest, a zip code, a city, a state, a country, and/or other information that can spatially identify an area. The content (also referred to hereinafter as "geofeed content") may be generated by content sources such as individuals, corporations, and/or other entities that may create content. In some embodiments, an address or other geo-location may be mapped to actual coordinates using third party tools for making such transformations. As used hereinafter, "a location," "a geo-location," "a geographically definable location," and similar language is not limited to a single location but may also refer to one or more such locations.

In many instances the created content can be automatically tagged with information such as user identifications, date/time information or geographic information that specifies a location where the content was created. For example, cameras equipped with Global Positioning Satellite ("GPS") units or other location-aware systems may embed into an image file latitude/longitude coordinates that indicate where a picture was taken. In addition, modern hand-held devices such as smartphones may be equipped with a GPS sensor, which allows users to generate content (text, photos and videos) with their devices and immediately share the content through a plurality of social networks. Moreover, some devices allow users to manually input the foregoing and other information for embedding into the content. Furthermore, editing software may allow a user to embed or otherwise associate information along with the content after the content was created.

System 100 may include a computer 110, a geofeed API 111, a content consumer device 130, provider APIs 140, content providers 150, and/or other components. In some implementations, computer 110 may include one or more processors 120 configured to perform some or all of a functionality of a plurality of modules, which may be stored in a memory 121. For example, the one or more processors may be configured to execute a a geofeed creation module 112, an organizing module 113, a retrieving module 114, a reporting and analysis module 115, an administration module 116, a communication module 117, a user interface module 118, and/or other modules 119.

Geofeed creation module 112 may be configured to create one or more geofeeds as described in U.S. patent application Ser. No. 13/284,455, filed Oct. 28, 2011, entitled "SYSTEM AND METHOD FOR AGGREGATING AND DISTRIBUTING GEOTAGGED CONTENT," and U.S. patent application Ser. No. 13/619,888, filed Sep. 14, 2012, entitled "SYSTEM AND METHOD FOR GENERATING, ACCESSING, AND UPDATING GEOFEEDS" both of which are incorporated by reference herein in their entirety.

Geofeed creation module 112 may format a request for a geofeed specific for different provider APIs 140 (illustrated in FIG. 1 as API 140A, 140B, . . . , 140N). The provider APIs may facilitate receiving content from corresponding content providers 150 (illustrated in FIG. 1 as content providers 150A, 150B, 150C). In some implementations, geofeed creation module 110 may format a request directly for content provider 150N without using a corresponding API. A content consumer device 130 may request and view geofeeds created by geofeed creation module 112.

In some embodiments, geofeed creation module 112 may take as input a list of one or more single points such as a list of one or more geo-coordinates. For example, a user may upload a list of the points in order to monitor multiple locations individually corresponding to a point. A radius or other region about the one or more single points may be used to define a geo-location specification for the point. For example, the point and a radius about the point may define a geo-location for which to monitor. In this manner, defining multiple locations to monitor may be made easier.

In some embodiments, geofeed creation module 112 may generate a geofeed definition that describes a geofeed such that a geofeed may be dynamically generated based on the geofeed definition. For example, the geofeed definition may include the geo-location specification, one or more geofeed parameters used to filter content aggregated from content providers 150, organization parameters that specify whether and how content within a geofeed should be grouped and/or whether and how a geofeed should be grouped with other geofeeds, and/or other information related to the geofeed that can be used to aggregate content from various content providers. For example, the one or geofeed parameters may be used to view only particular types of content, content from particular content providers, and/or other parameter by which to filter in or out content. The geofeed definition may be identified by a geofeed identifier and stored (e.g., in database 136) for later retrieval so that a content consumer or others may select and obtain a geofeed that was previously defined.

In some embodiments, geofeed creation module 112 may store the geofeed (e.g., in database 136). For example, geofeed creation module 112 may be configured to store the geofeed by aggregating content from content providers 150 in relation to the geofeed and store the content in association with a geofeed identifier and/or a geofeed definition. In a particular example, content of one or more geofeeds related to locations being monitored may be stored for later retrieval. In this manner, locations may be monitored using content that is dynamically retrieved from content providers 150 and/or from storage such as from database 136.

In some embodiments, a geofeed may be stored by storing one or more aspects of geofeed content from the content provider. For example, links to or within the geofeed content may be parsed and stored. The stored content may be associated with a burn date. In this manner, even if a content provider is experiencing downtime (e.g., cannot process requests for content), the system may retrieve the one or more aspects of stored content from a memory and a date in which the geofeed was burned. As such, a cache of geofeed content that may be used to obtain the content even when a content provider is unavailable to provide the content.

In some embodiments, geofeed creation module 112 may be configured to index the stored content. For example, when content is obtained from content providers 150, the content may be stored and indexed by keyword, geo-location, a user such as a content creator who created the content, a content provider who provided the content, date, time, and/or other information by which content may be indexed. The indexing may allow for robust searching and analysis of the content. In some embodiments, the indexing may occur on a regular basis and/or on-demand. For example, geofeed creation module 112 may periodically "crawl" content by obtaining and storing content related to one or more geo-locations from content providers 150 and indexing the stored content.

Organizing module 113 may be configured to organize the content and/or geofeeds based on the organization parameters. For example, the content and/or geofeeds may be organized into one or more groups. Each group may be assigned with a group identifier that identifies the group. The group identifier may include or be associated with a group name, which may be assignable by a user, a numeric database identifier, and/or other identifier that can identify the group. Organizing module 113 may be configured to associate the group identifier with one or more geofeeds such that a group may include one or more geofeeds. For example, a group identifier may be stored in association with a geofeed identifier used to identify a geofeed, a geofeed definition used to specify the geofeed to obtain content from content providers, and/or content of the geofeed.

Groups may themselves be organized hierarchically and/or arbitrarily, either or both of which allows for drill-down, roll-up, and/or other processing operations on geofeeds that can be used to monitor and analyze social media (and/or other content) from different levels. Organizing module 113 may be configured to organize groups of geofeeds based on a logical hierarchy of groups such as a geographic hierarchy or other logical hierarchy. A logical hierarchy of groups may include a hierarchy such that a group may be part of a larger group based on a logical relationship (e.g., city and state), where the larger group may be part of an even larger group (e.g., state and country).

Organizing module 113 may create a first group that includes a first set of one or more geofeeds, a second group that includes a second set of one or more geofeeds, and a third group that includes the first and second groups. Each group may include one or more geofeeds and each geofeed may be organized into one or more groups. The groups may be organized hierarchically and/or arbitrarily, either or both of which allows for drill-down, roll-up, and/or other processing operations on geofeeds that can be used to monitor and analyze social media (and/or other content) from different perspectives.

For example, a retail chain may create one or more geofeeds for each of its retail locations in order to monitor social media and/or other content relevant to geographically definable locations that define its retail locations. Organizing module 113 may create a first group that represents a particular city in which a retail chain has retail locations. The first group may include geofeeds for retail locations in the city. Organizing module 113 may further create a second group that represents another city in which the retail chain has retail locations and may similarly include geofeeds for retail locations in the other city. Organizing module 113 may further create a third group that represents a state or other region that includes the first and second groups.

The first, second, and third groups are therefore organized hierarchically such that the retail chain may monitor social media and/or other content relevant to its retail locations in a state via the third group and drill-down to different cities via the first and second groups, further drill down into particular geofeeds for particular locations within each city, and still further drill down into particular content of each geofeed. Similarly, using the organization created by organizing module 113, social media and/or other content relevant to its retail locations may be rolled up from individual geofeeds to city level groupings, state level groupings, and/or other groupings. Organizing module 113 may create other groupings of groups as well (e.g., a group that includes states, a group that includes countries, etc.).

Entities other than retail chains may use logically grouped hierarchies of geofeeds as well. For example, using system 100, news agencies that wish to leverage social media and/or other content that is relevant to geographically definable locations to drive news stories may organize content geographically. News agencies may monitor social media and/or other content at an international (or other level) and drill down (or up) as appropriate to national, state, or local levels. Similarly, using system 100, news agencies may organize geofeeds based on arbitrary groupings such as creating hotspot groups that each include geofeeds that have varying degrees of interesting content (e.g., a first group may include geofeeds that typically produce highly interesting content while a second group may include geofeeds that typically produce less interesting content).

Organizing module 113 may be configured to specify other levels and configurations of groupings, each allowing for drill-down, roll-up, and/or other presentation and analytical processing on social media and other content aggregated from various content providers that are relevant to individual geographically definable locations.

Organizing module 113 may be configured to organize groups of geofeeds based on arbitrary groups. An arbitrary group may include groups that do not necessarily share logical hierarchical relationships but rather may be related to geofeeds and/or other groups based on any relationship. For example, a user may arbitrarily assign a group such as "top grossing stores" or "hotspots of interesting content." In some embodiments, arbitrary groupings may include groupings based on time (e.g., when content is created, accessed, published, etc.), source (e.g., who created the content and/or who provided the content), volume (e.g., quantity of content where groups of geofeeds are based on a number of content), and/or other arbitrary groupings. Organizing module 113 may create a first group that includes a first set of one or more geofeeds based on a first arbitrary grouping and a second group that includes a second set of one or more geofeeds based on a second arbitrary grouping. For example, the organizing module may create a first group that includes geofeeds of top-grossing retail locations, a second group that includes geofeeds of lowest-grossing retail locations, and/or other arbitrary groupings.

In some embodiments, organizing module 113 may organize geofeeds into groups based on input from a user such as a content consumer. For example, organizing module 113 may receive as input a group identifier and one or more geofeed identifiers, geofeed definitions, and/or content aggregated in relation to a geofeed. The group identifier may be stored in association with the one or more geofeed identifiers, geofeed definitions, and/or content aggregated in relation to a geofeed. Similarly, organizing module 113 may organize groups with respect to other groups based on input from a user such as a content consumer.

In some embodiments, retrieving module 114 may be configured to obtain content based on the organization created by organizing module 113. For example, retrieving module 114 may be configured to receive a request for social media and/or other content based on a group. The request may include a pull request such as from a user via a user interface, an automated request that runs at regular intervals, and/or other request. Whether a pull request, an automated request, and/or other type of request, the retrieving module may be configured to store the obtained content and/or communicate the obtained content. The request may specify a group identifier. The retrieving module may identify one or more geofeeds that are associated with the group identifier and obtain content for the associated geofeeds.

Retrieving module 114 may identify one or more geofeeds associated with the group based on an association between the group and the one or more geofeeds, based on an association between the group and one or more other groups, and/or other association between groups and geofeeds. Retrieving module 114 may obtain stored content for the associated geofeeds from a memory such as geofeed database 136 and/or dynamically from respective content providers 150 using geofeed definitions that define the one or more geofeeds.

For example, a content consumer such as a chain retailer may wish to view social media and/or other content that may be relevant to retail locations in a particular city. Each retail location may be associated with a geofeed that is used to monitor social media and/or other content that is relevant to a geographically definable location around the retail location. The geofeeds may be organized into a first group that represents geofeeds of retail locations in the particular city.

Retrieving module 114 may receive from the content consumer a request to view geofeeds that are related to retail locations in the particular city. The content consumer may provide, and retrieving module 114 may receive, a group identifier that identifies the first group. Retrieving module 114 may identify geofeeds associated with the group identifier and obtain content associated with the geofeeds.

In some embodiments, the group identifier may be associated with other group identifiers. For example, the first group that represents the particular city may itself be associated with or include other groups such as groups for particular sections or neighborhoods of the city. In these embodiments, retrieving module 114 may identify the groups within the first group and obtain content for each of the identified groups within the first group. Retrieving module 114 may iteratively repeat the process until all groups within other groups have been processed.

In some embodiments, reporting and analysis module 115 may be configured to generate reports and analysis on aggregated content based on groupings made by organizing module 113. The reporting and analysis module may generate various statistics and metrics on social media and/or other content aggregated by the geofeed creation module and organized by the organizing module. The statistics and metrics may include, for example, a number of content associated with the group of geofeeds, numbers of content by type (e.g., number of video content, image content, etc.), numbers of content by source of content provider (e.g., number of FACEBOOK posts, TWEETs, etc.), a number of positive content or negative content, an average or median number of content per given time period (such as per month, week, day, specific times, etc.) for any single or combination of the foregoing, and/or other metrics that can be determined or obtained in relation to the geofeed content organized into groups.

In this manner, statistics and metrics may be drilled down from a regional or high level view to a more specific or lower-level view and vice versa. Thus, reporting and analysis module 115 may be used to provide trends, overall sentiment, and/or other metrics by which a location and groups that include different locations may be monitored. As such, the reporting and analysis module allows for drill-down and roll-up reporting of social media and/or other content that is relevant from one or more geographically definable locations and aggregated from various content providers.

In some embodiments, reporting and analysis module 115 may be configured to compare one or more metrics related to a first group with one or more metrics related to a second group. For example, metrics related to geofeeds associated with a retail chain's West Coast operations may be compared against metrics related to geofeeds associated with the retail chain's East Coast operations. In this manner, reporting and analysis module 115 may facilitate comparisons between different groups.

In some embodiments, administration module 116 may be configured to manage user accounts, set user roles such as security access roles, and/or perform other administrative operations. For example, administration module 116 may be used to set which user may access different groups created by organizing module 113. A regional manager, for instance, may be granted access to social media aggregated and organized into a regional group while a local store manager may be granted access only social media aggregated and relevant to the local store. In this manner, different users may be granted different access to various hierarchical or other groupings of geofeeds made by organizing module 113.

In some embodiments, administration module 116 may be configured to set roles that allow different users to organize content. For example, a user identification may be associated with a role that allows the user to create groups for geofeeds and place one or more of the geofeeds into the created groups.

In some embodiments, the administration module 116 may be configured to receive user preference settings such as, for example, a preferred communication channel for receiving geofeed content related to groups, metrics related to the groups, and/or other user preference information.

In some embodiments, communication module 117 may be configured to generate various communications related to the groups created by the organizing module. The one or more communication channels may include, for example, email, webpage, text message, and/or other communication channel that can communicate the obtained content. The communication module may determine which one or more communication channels should be used to communicate reports and/or aggregated content related to the groups and communicate the information via the one or more communication channels.

Figure 8:
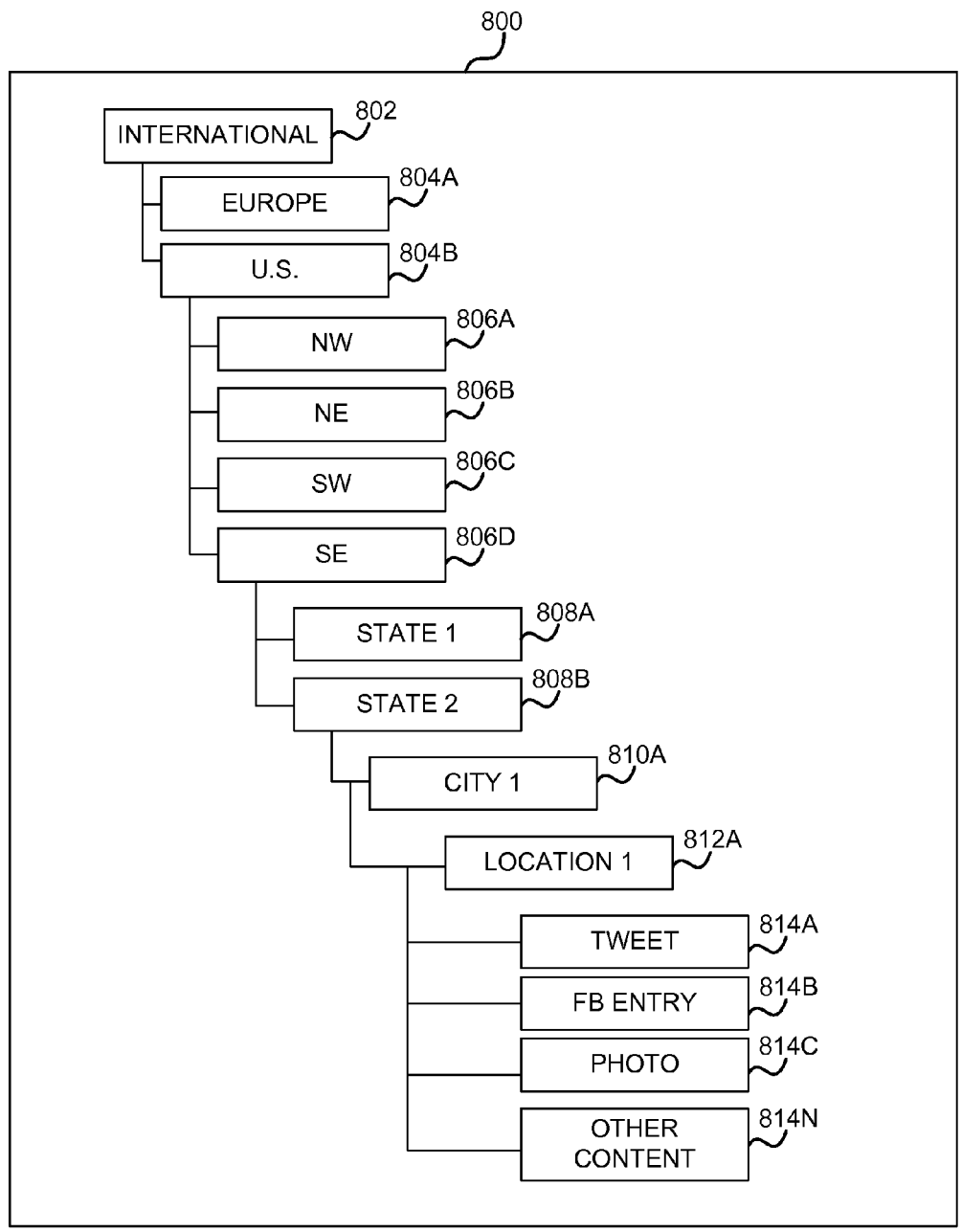
FIG. 8 illustrates a screenshot of an interface for displaying an organization of geofeeds, according to an aspect of the invention.

In some embodiments, user interface module 118 may be configured to generate user interfaces that allow viewing and interaction with the groups created by the organizing module. The interfaces may include map displays, collage displays, list displays, and/or other types of interfaces. Non-limiting examples of user interfaces are illustrated in FIGS. 8 and 9. In some embodiments, user interface module 118 may provide interfaces to annotate information related to groups. For example, user interface module 118 may receive, from a user, information related to groups and store such information in a memory such as database 136. In this manner, the system allows the user to enhance the geofeed and/or groups of geofeeds with additional information.

Those having skill in the art will recognize that computer 110 and content consumer device 130 may each comprise one or more processors, one or more interfaces (to various peripheral devices or components), memory, one or more storage devices, and/or other components coupled via a bus. The memory (e.g., memory 121) may comprise random access memory (RAM), read only memory (ROM), or other memory. The memory (e.g., memory 121) may store computer-executable instructions to be executed by the processor as well as data that may be manipulated by the processor. The storage devices may comprise floppy disks, hard disks, optical disks, tapes, or other storage devices for storing computer-executable instructions and/or data.

One or more applications, including various modules, may be loaded into memory (e.g., memory 121) and run on an operating system of computer 110 and/or consumer device 130. In one implementation, computer 110 and consumer device 130 may each comprise a server device, a desktop computer, a laptop, a cell phone, a smart phone, a Personal Digital Assistant, a pocket PC, or other device.

Network 102 may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network.

Figure 2:
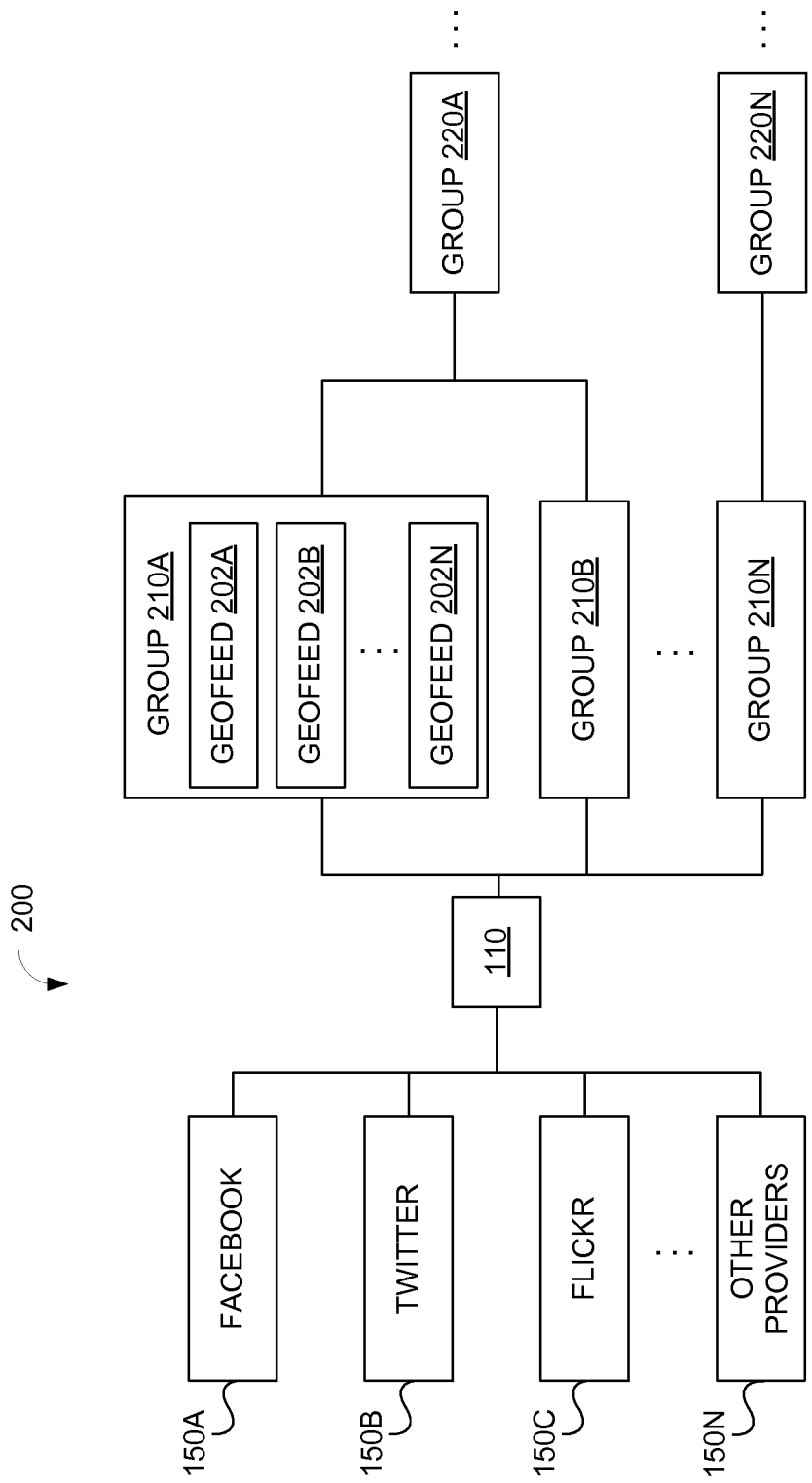
FIG. 2 illustrates a schematic diagram of a hierarchical organization of groups, according to an aspect of the invention.

FIG. 2 illustrates a schematic diagram 200 of an organization of geofeeds into hierarchical groups, according to an aspect of the invention. Computer 110 may aggregate content from various content providers 150 to generate individual geofeeds 202 (illustrated in FIG. 2 as geofeed 202A, 202B, . . . , 202N). Each geofeed 202 includes aggregated content that is relevant to one or more geographically definable locations. A geofeed may be grouped with other geofeeds into groups. For example, as illustrated, geofeeds 202 may be grouped together into a group 210A. Other geofeeds may be grouped into other groups. For example, groups 210B, 210N and/or other groups may each include groupings of geofeeds (not illustrated for convenience). In some embodiments, groups may be grouped together with other groups. For example, group 210A and group 210B may be grouped together into group 220A. In some embodiments, a single group may be grouped into another group. As illustrated, for example, group 210N may be placed into another group 220N. Such groupings may be iterated such that groups 220A and 220N may be grouped together, and so forth, forming a hierarchy of groups of geofeeds.

The hierarchical groupings may be specified in various ways. For example, a geofeed may be associated with a lower level set of groups (e.g., groups 210). In turn, the lower-level groups may be associated with higher-level groups (e.g., groups 220) and so forth. In this manner, some groups may be associated with geofeeds while other groups maintain a grouping hierarchy. For example, individual geofeeds corresponding to individual retail locations may be grouped into a lower-level "city" grouping such that geofeeds for retail locations in a given city are grouped together. The city group may be grouped with other city groups to form a higher-level state group. The state group may not be directly associated with geofeeds but by virtue of its association with city groups, geofeeds for the state group may be obtained. For example, geofeeds from the city group may be rolled up so that geofeeds for the state may be obtained. Similarly, state groups may be grouped together with other state groups to form a regional group, where geofeeds may be obtained for a region by rolling up cities into states and states into regions. Other hierarchical organizations of data may be used to hierarchically group geofeeds as well.

Figure 3:
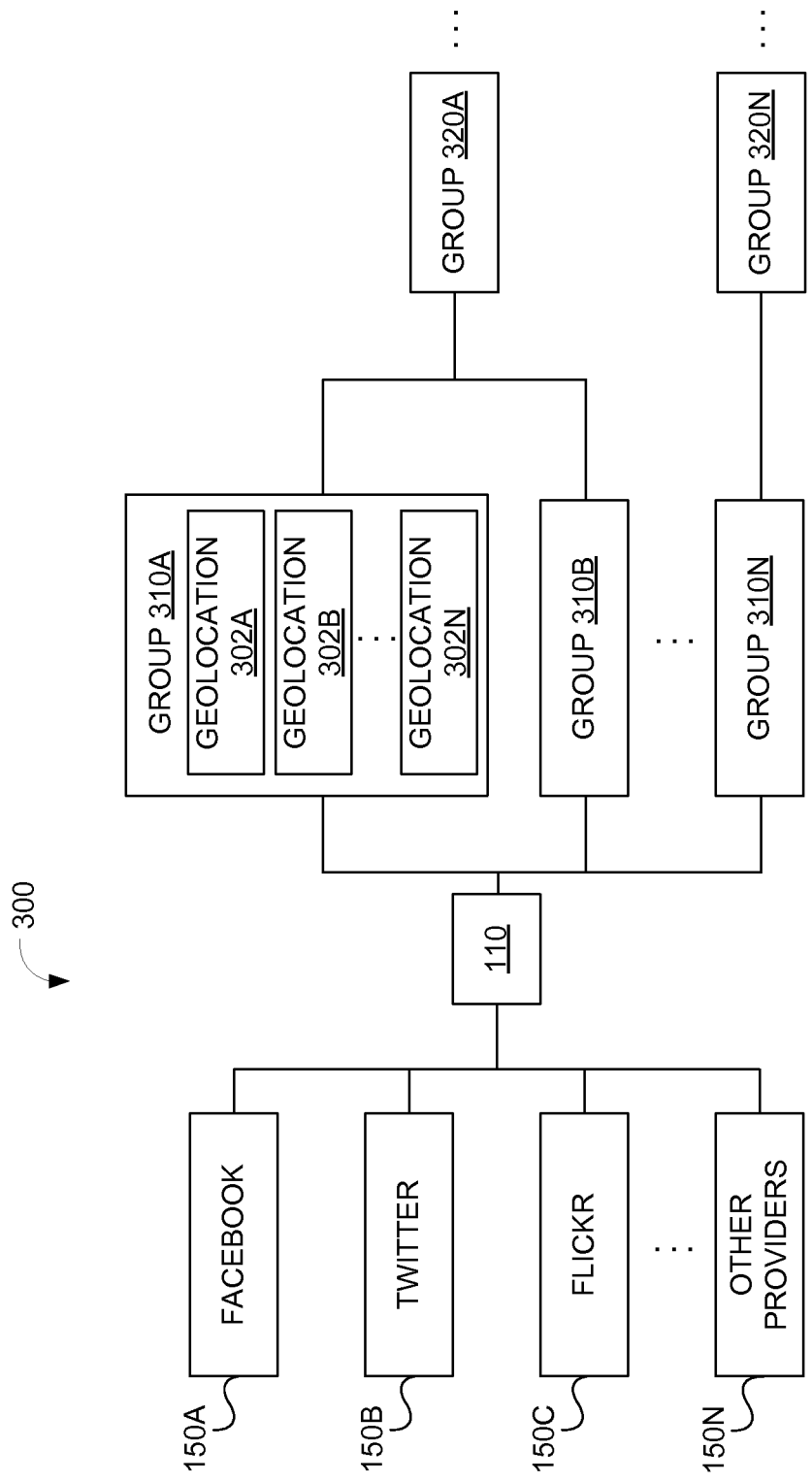
FIG. 3 illustrates a schematic diagram of an organization of geo-locations content into hierarchical groups, according to an aspect of the invention.

FIG. 3 illustrates a schematic diagram 300 of an organization of geo-locations content into hierarchical groups, according to an aspect of the invention. In some embodiments, geo-locations may be hierarchically arranged in a manner similar to geofeeds illustrated by the schematic diagram 200 of FIG. 2. For example, in schematic diagram 300 a single geofeed having various geo-locations for individual retail locations (to continue the non-limiting example from FIG. 2). In other words, a distinct geofeed may be created for each retail location as illustrated in FIG. 2 whereas in FIG. 3, a single geofeed may be created for an entire retail chain. Each geo-location 302 (illustrated in FIG. 3 as geo-locations 302A, 302B, . . . , 302N)) may be grouped with other geo-locations. For example, geo-locations 302 may be grouped into a group 310A. In some embodiments, groups may be grouped together with other groups. For example, group 310A and group 310B may be grouped together into group 320A. In some embodiments, a single group may be grouped into another group. As illustrated, for example, group 310N may be placed into another group 320N. Such groupings may be iterated such that groups 320A and 320N may be grouped together, and so forth, forming a hierarchy of groups of geo-locations.

In the configuration illustrated by FIG. 3, a retailer or other entity may create a single geofeed to represent multiple locations that may be organized as described herein. The retailer or other entity may also create different geofeeds representing different regions, each of which may be hierarchically organized. In some embodiments, a combination of schematic diagrams 200 and 300 may be used.

Figure 4:
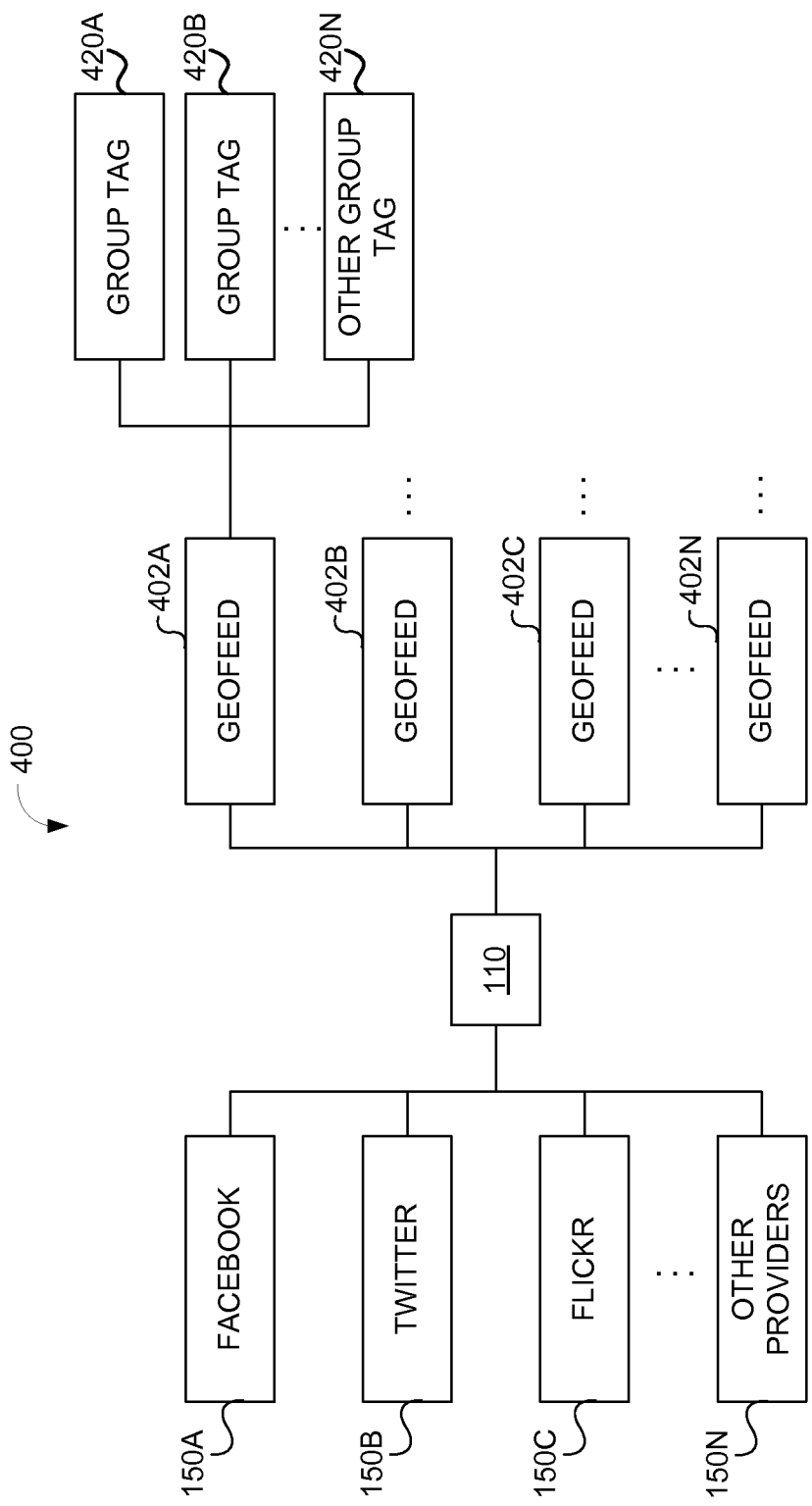
FIG. 4 illustrates a schematic diagram of an organization of geofeeds, according to an aspect of the invention.

FIG. 4 illustrates a schematic diagram 400 of an organization of geofeeds, according to an aspect of the invention. As illustrated, each geofeed 402 (illustrated in FIG. 4 as geofeeds 402A, 402B, 402C, . . . , 402N) may be associated with different groups 420 (illustrated in FIG. 4 as group tags 420A, 420B, . . . , 420N). Thus, each geofeed 402 may belong to more than one group. In this embodiment, hierarchies between groups may be stored as separate associations between groups. For example, instead of a lower-level group that includes associations between geofeeds and the lower-level group, each group may be associated with a geofeed and a hierarchy between geofeeds may be stored separately. Although not illustrated in FIG. 4, geo-locations may be similarly tagged with group names such that each geo-location may be associated with more than one group.

The various associations described with respect to the figures may be stored in a memory as database linkages or other associations. For example, group identifiers, geofeed identifiers, geofeed definition identifiers, content identifiers, and/or other identifiers may be associated with one another in a database and stored in the database.

Figure 5:
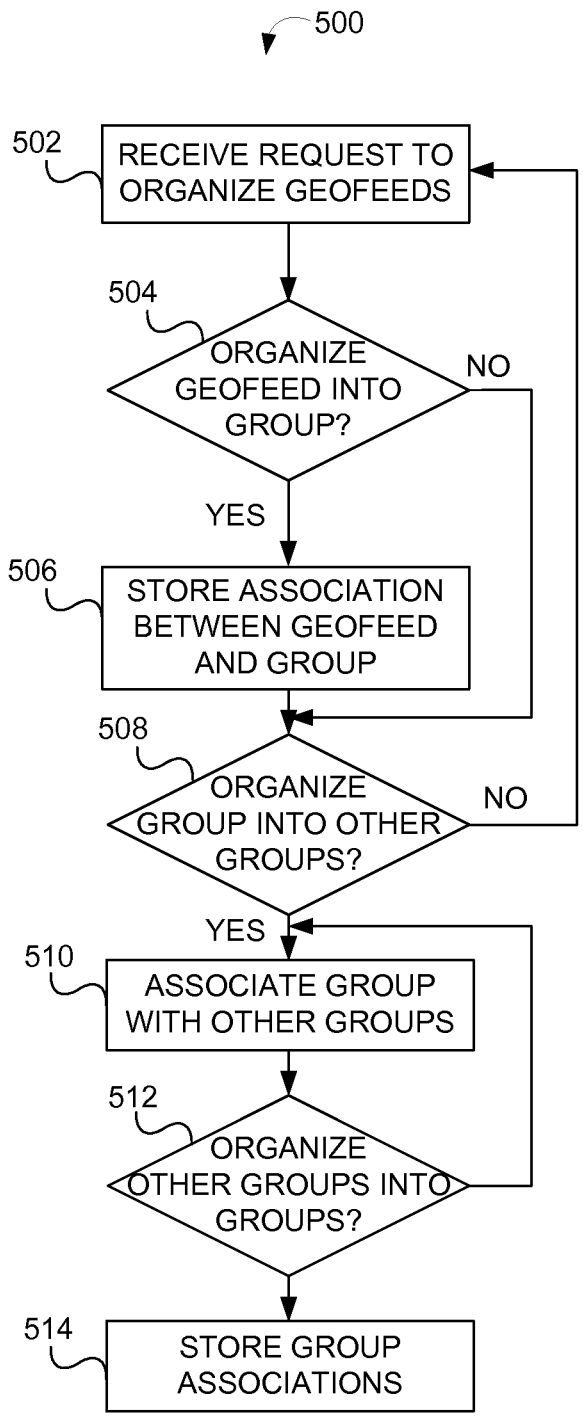
FIG. 5 illustrates a process of organizing content from one or more groups of individual sets of a plurality of content aggregated from content providers and relevant to one or more geographically definable locations, according to an aspect of the invention.

FIG. 5 illustrates a process 500 of organizing content from one or more groups of individual sets of a plurality of content aggregated from content providers and relevant to one or more geographically definable locations, according to an aspect of the invention. The various processing operations and/or data flows depicted in FIG. 5 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 502, a request to organize geofeeds may be received. The request may include a pull request such as from a user via a user interface, an automated request that runs at regular intervals and causes the geofeeds to be organized, and/or other request. The retrieving module may identify one or more geofeeds that are associated with the group identifier and obtain content for the associated geofeeds.

In an operation 504, a determination of whether to organize a geofeed into a group may be made. For example, a request to organize geofeeds may supply an identifier that identifies a stored geofeed, a geofeed definition, stored geofeed content, and/or other information that identifies a geofeed and/or geofeed content. The request may also specify a group identifier for a pre-existing group and/or a new group specification into which the geofeed and/or geofeed content should be grouped.

If in operation 504, it is determined that a geofeed is to be organized into a group, an association between the geofeed and the group may be stored in a memory such as in geofeed database 136 in operation 506. The association may include a database link between the geofeed and group (or identifiers corresponding to the geofeed and group), and/or other types of associations.

In an operation 508, a determination of whether to organize a group into one or more other groups may be made. If in operation 508, it is determined that a group is to be organized into one or more other groups, the group may be associated with the one or more other groups in an operation 510. For example, the group may be associated with another group in a parent-child relationship for a hierarchy, a flat relationship such as a sibling-sibling relationship, and/or other type of relationship.

In an operation 512, a determination of whether the one or more other groups is to be organized into still one or more other groups may be made. For example, a hierarchy of groups may span multiple levels of groups such as when a city group should be grouped into a state group and a state group should be grouped into a regional group, and so forth. If the one or more other groups are to be included in still one or more other groups, process 500 may return to operation 510, where the other groups are associated with the still other groups. Operations 510 and 512 may iterate until all groups have been processed. In this manner, multiple levels of hierarchical groupings may be made.

Returning to operation 512, if no more groups are to be associated with other groups, the associations between groups from operations 510 and 512 may be stored in a memory such as geofeed database 136.

Figure 6:
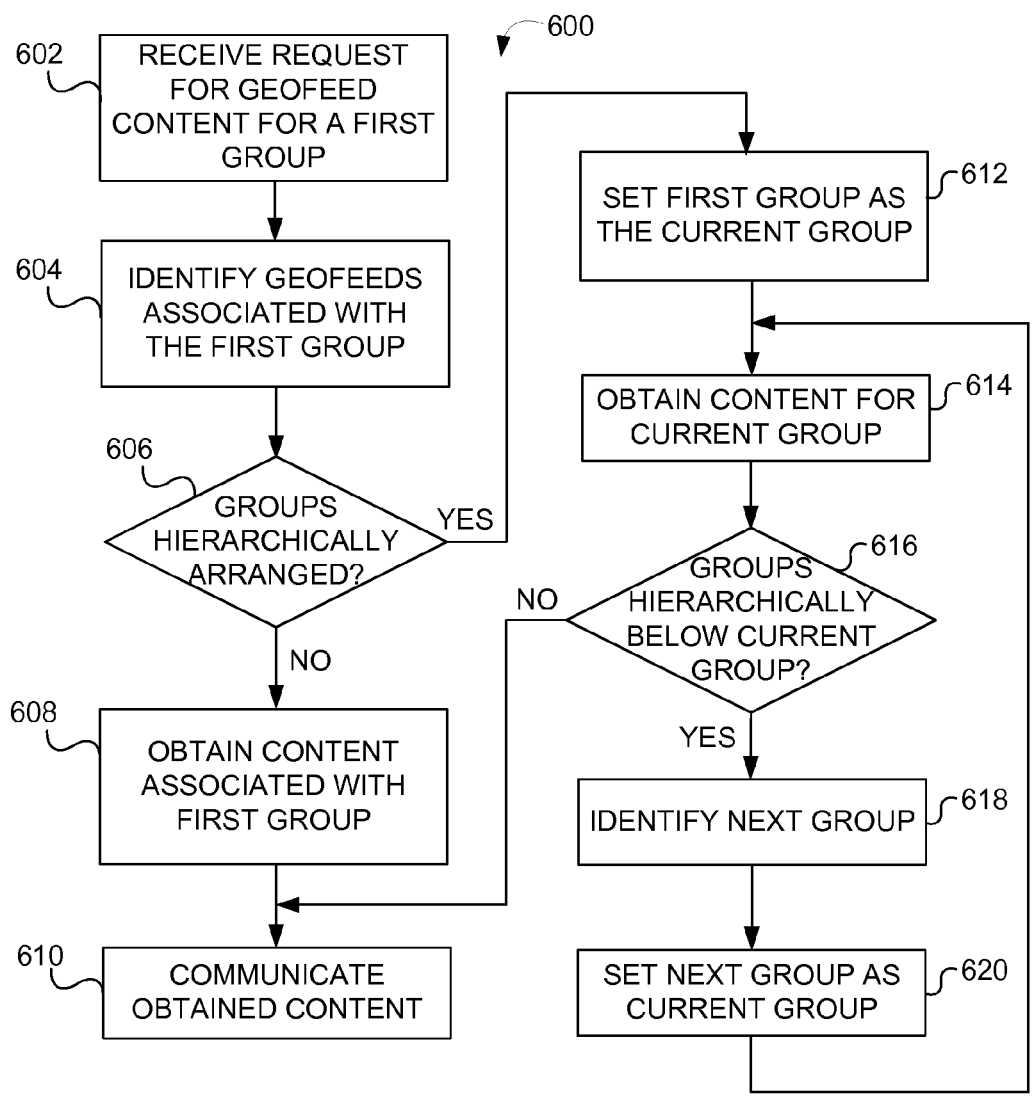
FIG. 6 illustrates a process of obtaining and providing content from one or more groups of individual sets of a plurality of content aggregated from content providers and relevant to one or more geographically definable locations, according to an aspect of the invention.

FIG. 6 illustrates a process 600 of obtaining and providing content from one or more groups of individual sets of a plurality of content aggregated from content providers and relevant to one or more geographically definable locations, according to an aspect of the invention.

In an operation 602, a request for geofeed content associated with a first group may be received. The request may include a pull request such as from a user via a user interface, an automated request that may run at preset intervals or otherwise caused to be automatically run to request geofeed content for the first group, and/or other type of request that causes the geofeed content associated with the first group to be obtained. The first group may represent, for example, a region of a country that has multiple retail locations of a retail chain. The request may include a request to view or otherwise obtain geofeed content related to the retail locations in the region.

In an operation 604, one or more geofeeds that are associated with the first group may be identified. In one embodiment, an association between a group identifier that identifies the first group and a geofeed identifier that identifies the one or more geofeeds may be used to identify the one or more geofeeds. In one embodiment, an association between the group identifier and one or more geofeed definitions that specify the one or more geofeeds may be used to identify the one or more geofeeds. In one embodiment, an association between the group identifier and one or more content identifiers that identify content aggregated for a geofeed may be used to identify the one or more geofeeds. Continuing the above example, the multiple geofeeds related to retail locations in the region may be identified.

In an operation 606, a determination of whether the first group includes other groups may be made. The region of the country from the above example may include other groups such as groups that represent states within the region. In operation 606, it may be determined whether the first group that represents the region is associated with other groups that represent, for example, states.

In an operation 608, if the first group is not associated with other groups, content for the identified one or more geofeeds (from operation 604) may be obtained. Content for the identified geofeeds may be obtained from a memory such as geofeed database 136 and/or dynamically obtained from content providers using geofeed definitions corresponding to the identified geofeeds. The content may be filtered, integrity checked, sorted, and/or otherwise post-processed. In embodiments that obtain the content dynamically from content providers, various geofeed parameters may be included in the formatted request to the content providers that narrow results received from the content providers.

In the above example, the first group representing the region may not be associated with other groups but instead be directly associated with geofeeds. In this instance, the first group may be directly associated with geofeeds, geofeed definitions, geofeed content, etc.

In an operation 610, the obtained content may be communicated via one or more communication channels. The one or more communication channels may include, for example, email, webpage, text message, and/or other communication channel that can communicate the obtained content. In some embodiments, instead of or in addition to being communicated, the obtained content may be stored and/or indexed for later retrieval.

Returning to operation 606, if the first group is associated with other groups, the first group may be set in memory as a current group for iteration purposes in an operation 612. For example, the first group that represents the region may be associated with other groups that represent states within the region. For iterative purposes, each group that represents the different states may be set as the current group so that content for each may be iteratively obtain.

In an operation 614, content for the current group may be obtained in a manner similar to that described with respect, to operation 606. Content for the current group may be obtained by identifying one or more geofeeds associated with the current group and obtaining content for the identified geofeeds.

In an operation 616, a determination of whether the other groups also are associated with still other groups may be made. If the other groups are also associated with still other groups, a next group among the still other groups may be identified in an operation 618. For example, groups that represent states may be further associated with other groups that represent cities. In an operation 620, the next group may be set as the current group for iterative purposes and processing may return to operation 614, where content for the current group may be obtained in a manner similar to that described with respect to operation 606. In this manner, content for groups that represent cities may be obtained. The process may iterate until no more groups associations are found. In this manner, a hierarchy of groups may be traversed to obtain content.

Returning to operation 616, if the other groups are not associated with still other groups, processing may proceed to operation 610, where the obtained content is communicated as described herein.

Figure 7:
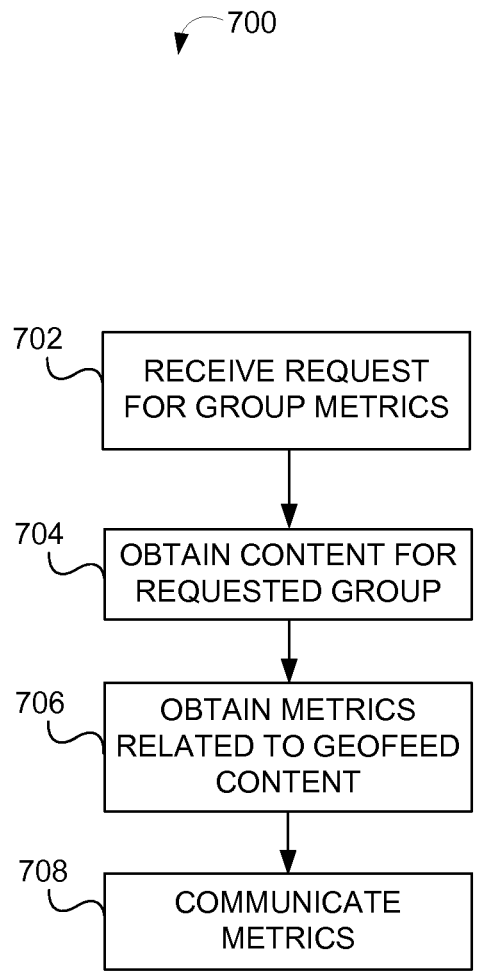
FIG. 7 illustrates a process of providing metrics for one or more groups of individual sets of a plurality of content aggregated from content providers and relevant to one or more geographically definable locations, according to an aspect of the invention.

FIG. 7 illustrates a process 700 of providing metrics for one or more groups of individual sets of a plurality of content aggregated from content providers and relevant to one or more geographically definable locations, according to an aspect of the invention.

In an operation 702, a request for group metrics may be received. In an operation 704, content for the requested group may be obtained. The content may be obtained in a manner similar to process 600 described with respect to FIG. 6. In an operation 706, metrics related to the geofeed content may be obtained. For example, the metrics may include a number of content associated with the group of geofeeds, numbers of content by type (e.g., number of video content, image content, etc.), numbers of content by source of content provider (e.g., number of FACEBOOK posts, TWEETs, etc.), a number of positive content or negative content, an average or median number of content per given time period (such as per month, week, day, specific times, etc.) for any single or combination of the foregoing, and/or other metrics that can be determined or obtained in relation to the geofeed content organized into groups.

In an operation 708, the metrics may be communicated via one or more communication channels. In some embodiments, process 700 may be used to generate metrics in a drill-down or rolled-up manner. For example, after metrics for a group representing a region is communicated, a user may drill-down to obtain metrics for geofeed content associated with a group representing a state or other locality within the region.

FIG. 8 illustrates a screenshot of an interface 800 for displaying an organization of geofeeds, according to an aspect of the invention. The screenshots illustrated in FIG. 8 and other drawing figures are for illustrative purposes only. Various components may be added, deleted, moved, or otherwise changed so that the configuration, appearance, and/or content of the screenshots may be different than as illustrated in the figures. Accordingly, the graphical user interface objects as illustrated (and described in greater detail below) are exemplary by nature and, as such, should not be viewed as limiting.

As illustrated, interface 800 may present a tree-like hierarchy for displaying groupings of geofeeds. For example, a group 802 may include a grouping of groups 804 (illustrated in FIG. 8 as groups 804A and 804B). Group 804B may include groups 806 (illustrated in FIG. 8 as groups 806A, 806B, 806C, 806D). Group 806D may include groups 808 (illustrated in FIG. 8 as groups 808A, 808B). Group 808B may include groups 810 (illustrated in FIG. 8 as group 810A). Group 810A may be associated with geofeeds 812 (illustrated in FIG. 8 as geofeed 812A). Each geofeed 812 may include content 814 (illustrated in FIG. 8 as content 814A, 814B, 814C, . . . , 814N) that is relevant to one or more geographically definable locations and aggregated from various content providers based on requests formatted specifically for individual ones of the content providers.

The hierarchical grouping may be used in various ways. For example, as illustrated, group 802 may represent an international group for a retail chain that operates internationally. Groups 804 may represent individual countries of the retail chain. Groups 806 may represent different regions of the country and groups 808 may represents localities such as states within a region. Groups 810 may represent cities within the localities and geofeed 812 may include social media and/or other content that is aggregated from content providers and is relevant to one or more geographically definable locations related to a retail store. A retail location may include more than one geographically definable location such as instances where a drive-through and main lobby may be separately geo-fenced. Other retail locations may be associated with only a single geographically definable location.

In some embodiments, the hierarchical groupings allow the retail chain, for example, to monitor social media and/or other content related to its retail locations separately or in combination with other retail locations. Furthermore, interface 800 allows for roll-up and drill-down viewing of social media content and/or other content of the organized geofeeds.

In one mode of operation, a selection of group 810A, for example, may roll up all geofeed content of geofeeds 812A that are grouped into group 810A. Similarly, a selection of group 808B may roll up all geofeed content related to groups 810A, and so forth.

In another mode of operation, a selection of group 810A my drill-down to show groups that are grouped into group 810A. Further drill-downs may be iterated until individual content is displayed.

In some embodiments, only a portion of geofeed content may be communicated. For instance, various ranking or filtering may be applied to results such that only a portion of content is displayed. In some embodiments, metrics and analysis may be applied and displayed. For example, for each group and/or geofeed, metrics such as number of content, number of types of content, etc., may be displayed to provide the user with an indication of the metrics for each group and/or geofeed.

As would be appreciated, more or less groups and levels of groups may be used as necessary.

FIGS. 9A-E illustrate screenshots of various interfaces for displaying an organization of geofeeds, according to an aspect of the invention. FIG. 9A illustrates an interface 900 that includes selectable elements that may cause an interface of FIG. 9B to be communicated such as, for example, in a separate window or within the same window. Similarly, the interface of FIG. 9B may include selectable elements that cause an interface of 9C to be communicated. Referring to FIG. 9A, interface 900 may present a map view of a geographic grouping. FIG. 9C may include selectable elements that cause an interface of 9D to be communicated. FIG. 9D may include selectable elements that cause an interface of 9E to be communicated.

As illustrated, different groups 806 that represent different regions may be displayed on a map. Other views (e.g., non-map views) may be used as well to display groups. Each group 806 may include selectable groups 808 that represent different localities of the regions. For example, group 808B may be selected to drill-down to view groups 810 organized into group 808, as illustrated in FIG. 9B. Group 810B may be selected to drill-down to view geofeeds 812 organized into group 810, as illustrated in FIG. 9C. Geofeed 812A may be selected to drill-down to view geofeed content 814 aggregated into geofeed 812, as illustrated in FIG. 9D. Geofeed content 814 may be selected to reveal the actual social media content and/or other content aggregated from social media providers based on requests formatted specifically for individual ones of the social media providers.

In any of the interfaces illustrated in FIGS. 9A-9E, various metrics and analysis may be applied and displayed for relevant groups, geofeeds, and/or content displayed therein.

Although described herein as grouping geofeeds and/or grouping geo-locations, individual geofeed content aggregated from content providers may be grouped as described herein as well and such groupings may be stored, retrieved, analyzed, displayed, and/or otherwise processed as described herein.

Other embodiments, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A system for providing geofeeds organized with respect to other geofeeds, the system comprising:
one or more processors configured to execute computer program modules, the computer program modules comprising:
a retrieving module configured to:
receive a request for geofeed-related content for a first group of geofeeds, the first group of geofeeds comprising at least a first geofeed and a second geofeed, the first geofeed comprising first content aggregated from a plurality of content providers based on respective requests formatted specifically for individual ones of the plurality of content providers and is relevant to one or more first geographically definable locations, the second geofeed comprising second content aggregated from the plurality of content providers based on respective requests formatted specifically for individual ones of the plurality of content providers and is relevant to one or more second geographically definable locations that is different from the one or more first geographically definable locations;

identify the first geofeed and the second geofeed based on the request;

obtain at least a portion of the first content, at least a portion of the second content, or at least a portion of both the first content and the second content based on the identified first geofeed and the second geofeed;

receive a request for a second group that includes the first group and at least one other group, the at least one other group comprising at least a third geofeed comprising third content aggregated from the plurality of content providers based on respective requests formatted specifically for individual ones of the plurality of content providers and is relevant to one or more third geographically definable locations that is different from the one or more first geographically definable locations and different from the one or more second geographically definable locations;

identify the third geofeed based on the request for the second group based on the request;

obtain at least a portion of the first content, at least a portion of the second content, at least a portion of the third content, or at least a portion of the first content, the second content, and the third content based on the identified first geofeed and the second geofeed; and a communication module configured to:
communicate the obtained content.

2. The system of claim 1, wherein the request comprises a pull request from a user or an automated request.

3. The system of claim 1, wherein the request for the second group is received before the request for the first group such that the request for the first group comprises a drill-down from the request for the second group.

4. The system of claim 1, the system further comprising:
a reporting and analysis module configured to:
obtain one or more metrics related to the first group, the second group, or both the first group and the second group; and
provide the obtained metrics.

5. The system of claim 4, wherein the reporting and analysis module configured to:
obtain one or more metrics related to the first group based on a roll-up of the first content of the first geofeed and the second content of the second geofeed.

6. The system of claim 1, the system further comprising:
a reporting and analysis module configured to:
obtain one or more first metrics related to the first geofeed;
obtain one or more second metrics related to the second geofeed;
compare the one or more first metrics and the one or more second metrics; and
provide the compared one or more first metrics and one or more second metrics.

7. The system of claim 1, wherein the first geofeed is relevant to a single geographically definable location that includes content and the second geofeed is relevant to at least two geographically definable locations.

8. The system of claim 1, further comprising:
an administration module configured to:
set one or more user roles comprising at least a user role that restricts access to one or more groups of geofeeds.

9. A method for providing geofeeds organized with respect to other geofeeds, the method being implemented in a computer that includes one or more processors programmed by one or more computer program modules, the method comprising:

receiving, by a retrieving module, a request for geofeed-related content for a first group of geofeeds, the first group of geofeeds comprising at least a first geofeed and a second geofeed, comprising at least a first geofeed and a second geofeed, the first geofeed comprising first content aggregated from a plurality of content providers based on respective requests formatted specifically for individual ones of the plurality of content providers and is relevant to one or more first geographically definable locations, the second geofeed comprising second content aggregated from the plurality of content providers based on respective requests formatted specifically for individual ones of the plurality of content providers and is relevant to one or more second geographically definable locations that is different from the one or more first geographically definable locations;

identifying, by the retrieving module, the first geofeed and the second geofeed based on the request;

obtaining, by the retrieving module, at least a portion of the first content, at least a portion of the second content, or at least a portion of both the first content and the second content based on the identified first geofeed and the second geofeed; and receiving, by the retrieving module, a request for a second group that includes the first group and at least one other group, the at least one other group comprising at least a third geofeed comprising third content aggregated from the plurality of content providers based on respective requests formatted specifically for individual ones of the plurality of content providers and is relevant to one or more third geographically definable locations that is different from the one or more first geographically definable locations and different from the one or more second geographically definable locations;

identifying, by the retrieving module, the third geofeed based on the request for the second group based on the request;

obtaining, by the retrieving module, at least a portion of the first content, at least a portion of the second content, at least a portion of the third content, or at least a portion of the first content, the second content, and the third content based on the identified first geofeed and the second geofeed; and communicating, by a communication module, the obtained content.

10. The method of claim 9, wherein the request comprises a pull request from a user or an automated request.

11. The method of claim 9, wherein the request for the second group is received before the request for the first group such that the request for the first group comprises a drill-down from the request for the second group.

12. The method of claim 9, the method further comprising:
obtaining, by a reporting and analysis module, one or more metrics related to the first group, the second group, or both the first group and the second group; and providing, by the reporting and analysis module, the obtained metrics.

13. The method of claim 12, the method further comprising:
obtaining, by the reporting and analysis module, one or more metrics related to the first group based on a roll-up of the first content of the first geofeed and the second content of the second geofeed.

14. The method of claim 9, the method further comprising:
obtaining, by a reporting and analysis module, one or more first metrics related to the first geofeed;
obtaining, by the reporting and analysis module, one or more first metrics related to the second geofeed;
comparing, by the reporting and analysis module, the one or more first metrics and one or more second metrics; and
providing, by the reporting and analysis module, the compared one or more first metrics and one or more second metrics.

15. The method of claim 9, wherein the first geofeed is relevant to a single geographically definable location that includes content and the second geofeed is relevant to at least two geographically definable locations.

16. The method of claim 9, the method further comprising:
setting, by an administration module, one or more user roles comprising at least a user role that restricts access to one or more groups of geofeeds.

17. A system for organizing geofeeds, the system comprising:
one or more processors configured to execute computer program modules, the computer program modules comprising:
an organizing module configured to:
associate a first group with at least a first geofeed and a second geofeed,
the first geofeed comprising first content aggregated from a plurality of content providers based on respective requests formatted specifically for individual ones of the plurality of content providers and is relevant to one or more first geographically definable locations,
the second geofeed comprising second content aggregated from the plurality of content providers based on respective requests formatted specifically for individual ones of the plurality of content providers and is relevant to one or more second geographically definable locations that is different from the one or more first geographically definable locations;
associate a second group with at least a third geofeed and a fourth geofeed,
the third geofeed comprising third content aggregated from a plurality of content providers based on respective requests formatted specifically for individual ones of the plurality of content providers and is relevant to one or more third geographically definable locations,
the fourth geofeed comprising fourth content aggregated from the plurality of content providers based on respective requests formatted specifically for individual ones of the plurality of content providers and is relevant to one or more fourth geographically definable locations that is different from the one or more third geographically definable locations;
associate the first group with the second group into a third group that comprises the first group and the second group; and
store in a memory the associations of (i) the first group with the first geofeed and the second geofeed, (ii) the second group with the third geofeed and the fourth geofeed, and (iii) the first group and the second group.

18. The system of claim 17, wherein the organizing module is further configured to:
receive a request to organize the first geofeed, the second geofeed, the third geofeed, and the fourth geofeed, the request comprising identifications of the first geofeed, the second geofeed, the third geofeed, the fourth geofeed, the first group, and the second group.

19. The system of claim 17, wherein the organizing module is further configured to:
directly associate the first geofeed and the second geofeed with the first group; and
indirectly associate the first geofeed and the second geofeed with the third group via the second group.

20. The system of claim 19, wherein the organizing module is further configured to:
directly associate the third geofeed and the fourth geofeed with the second group; and
indirectly associate the third geofeed and the fourth geofeed with the third group via the second group.

21. The system of claim 17, wherein the organizing module is further configured to:
directly associate the first geofeed and the second geofeed with the first group and the second group; and
directly associate the first group with the second group.

* * * * *